United States Patent [19]

Renaud

[11] 4,186,828
[45] Feb. 5, 1980

[54] CLUTCH RELEASE BEARINGS

[75] Inventor: Pierre J. Renaud, Le Plessis-Trevise, France

[73] Assignee: Societe Anonyme Francaise du Ferodo, Paris, France

[21] Appl. No.: 922,190

[22] Filed: Jul. 5, 1978

[30] Foreign Application Priority Data

Jul. 8, 1977 [FR] France ............................... 77 21044
Jan. 4, 1978 [FR] France ............................... 78 00176

[51] Int. Cl.$^2$ ............................................. F16D 19/00
[52] U.S. Cl. .................................................... 192/98
[58] Field of Search ................... 192/98; 308/233, 230

[56] References Cited

U.S. PATENT DOCUMENTS

| 3,277,988 | 10/1966 | Pitner | 308/233 X |
| 4,026,399 | 5/1977 | Ladin | 308/233 X |
| 4,144,957 | 3/1979 | de Gennes | 192/98 |

FOREIGN PATENT DOCUMENTS 1382354 1/1975 United Kingdom ..................... 192/98

Primary Examiner—H. Hampton Hunter
Attorney, Agent, or Firm—Charles E. Brown

[57] ABSTRACT

A clutch release bearing of the self-centering variety in which a drive member is clamped to a flange on an operating member by means of a resilient washer clipped to a bearing plate member. The bearing plate member protects the flange as it is interposed between the associated release fork and the flange. Raised interlock portions, in axial registry with retaining portions cooperating with the release fork, are received in notches along the inner periphery of the bearing plate member and prevent relative rotation between the operating member and the bearing plate member. Axial tabs may be provided along tangential edges of the notches, overlying the flats on the raised interlock portions for preventing wear due to the release fork. An axial tongue protruding in the same direction as the axial tabs insures reassembly of the release bearing on the release fork with the original relative orientation.

17 Claims, 8 Drawing Figures

CLUTCH RELEASE BEARINGS

BACKGROUND OF THE INVENTION

The present invention relates generally to clutch release bearings.

Clutch release bearings essentially comprise an annular operating member adapted to be displaced by control means, namely a clutch release fork linked to a clutch pedal, and an annular drive member having an actuating part which is mounted for rotation relative to the operating member and is adapted in response to displacements of the latter to actuate the rotational release levers or fingers of an associated clutch.

The invention relates more particularly to such clutch release bearings in which the operating member has at least one laterally projecting retaining portion, and in practice two such retaining portions disposed diametrically opposite each other and spaced from a transverse face of the operating member against which the control means or release fork bears. The operating member of the release bearing being adapted in the course of assembly to be brought into engagement on the release fork through the free axial space between the aforesaid transverse face and the retaining portion(s).

An annular bearing plate member usually covers the transverse face on the operating member, especially when the operating member is made of synthetic plastic material, in order to prevent untimely wear and shortened service life.

SUMMARY OF THE INVENTION

A general object of the present invention is the provision of an arrangement permitting, inter alia, easy and quick mounting of the bearing plate member on the operating member.

Another object of the invention is a bearing plate member fixed against rotation on the operating member and thereby a release bearing fixed against rotation relative to an associated release fork.

According to the invention there is provided a clutch release bearing of the foregoing type which is characterized by at least one notch along the inner periphery of said annular bearing plate member and an interlock portion on said operating member cooperable with said notch for prevent rotation of said bearing plate member relative to said operating member.

The mounting of the bearing plate member on the operating member may be effected by inserting the same obliquely over the retaining portion on the operating member, then, after straightening it, by further axial insertion onto the interlock portion on the operating member.

Preferably, however, the bearing plate member is provided with at least two such notches at its inner periphery, i.e., one adapted to axially clear the retaining portion on the operating member and the other, as above, adapted to engage the interlock portion on the operating member once the bearing plate member is in position. In this case the assembly of the bearing plate member on the operating member is carried out in a single action, first by axial insertion until the retaining portion on the operating member is cleared, then by angular movement, e.g. about 90° until the other notch comes into line with the interlock portion, and finally by axial engagement of the last notch on the interlock portion.

As disclosed, the operating member comprises the retaining portions and the interlock portions, the annular bearing plate member received thereon comprising four notches along its inner periphery in cruciform arrangement, that is two diametrically opposed notches for clearing the retaining portions and two other diametrically opposed notches for cooperation with the interlock portions.

Since the fixing of the bearing plate member against rotation is insured by the interlock portions it is to be underscored that the inner periphery of the bearing plate member according to the invention comprises at least one notch and that it forms a complementary interlock zone which is adapted to cooperate for axial engagement and interlock portion provided on the surface of the operating member, which may be a mere flat, for instance, with one or more indentations.

In any event, by the mere action of the release fork associated, in operation, with the release bearing the bearing plate member received on the operating member may be appropriately axially held in position, the release fork bearing against the retaining portion(s) on the operating member and against a bearing surface on the bearing plate member.

Yet, the bearing plate member is preferably, as known per se, attached axially to the clamping means clamping the operating member against the drive member.

Moreover, the axial extent of the interlock portions or the key portions on the operating member is preferably greater than the axial extent of the bearing plate member so that the same interlock or key portions are capable of not only fixing the bearing plate member against rotation on the operating member but, in addition, by axial engagement with the associated release fork, prevent the rotation of the operating member and, therefore, the rotation of the entire release bearing on the release fork.

Hence, not only the mounting of the bearing plate on the operating member of the release bearing but also the mounting of the release bearing with respect to the associated release fork is considerably simplified.

According to a preferred embodiment the bearing plate member which is made of metal has in line with the notch at its inner periphery, axial tabs adapted to overlie the interlock portions, whereupon the edge of the release fork comes into contact with the axial tabs.

Accordingly advantage of the annular bearing plate is taken for protecting the interlock portion on the operating member against wear due to the release fork.

Finally, according to a further development of the invention, the bearing plate member comprises at its inner periphery in addition to the just mentioned axial tabs, an axial tongue which extends axially in the same direction as the tabs and therefore away from the drive member and is disposed circumferentially between the tabs and, therefore, between corresponding notches, at 90° therefrom.

Thanks to the axial tongue, the release bearing must be positioned according to a predetermined diametral orientation with respect to the release fork to which it is attached, failing that it is not possible to assemble the same.

The presence of the bearing plate member is also used to provide failsafe means which permit the mounting of the release bearing relative to the release fork only along a predetermined diametral direction.

It has been established that present-day release bearings when put back into place following disassembly for servicing, may be mounted in one of two different diametral orientations relative to the release fork.

Now, in order to properly adapt such a release bearing to the clutch release means with which it is associated, it is desirable to take the wear of the parts into account so that the release bearing is in the same orientation relative to the clutch release means as before disassembly.

The axial tongue impedes or prevents reassembling the release bearing in an orientation other than initial orientation.

These and other features and advantages of the invention will become clear from the description which follows, given by way of example, with reference to the accompanying schematic drawings.

DESCRIPTION OF THE PREFERRED EMBODIMENTS

Figure 3:
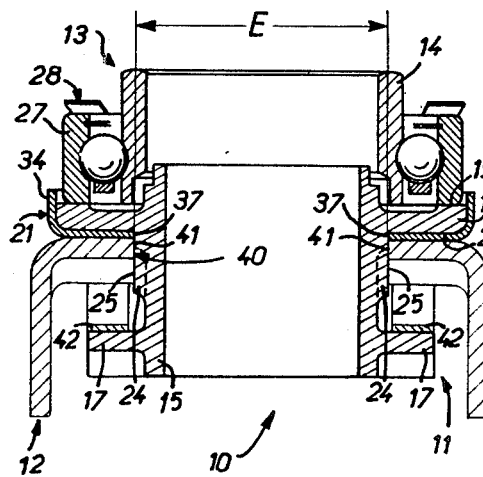
FIG. 3 is another axial cross-sectional view taken along line III—III in FIG. 1, the release bearing being as represented in position on the release fork with which it is associated.

Generally speaking, and as represented in the attached drawings, the present release bearing 10 comprises an operating member 11 which is adapted to be displaced by a control means, here a clutch release fork 12, shown in FIG. 3, and a drive member 13 including an actuating part 14 which is mounted for rotation relative to the operating member 11 and is adapted in response to the latter to depress the clutch release levers or fingers of an associated clutch (also referred to as clutch release means and not shown in the drawings) in order to declutch.

As is known per se, the operating member 11 which is overall annular configuration, e.g. of synthetic plastic material, comprises a sleeve 15 which is adapted to be received on any sort of supporting and guiding member, generally the "trumpet" which usually surrounds the input shaft of the gear box (not shown) which follows the clutch.

At the end of the sleeve 15 axially remote from the drive member two retaining portions 17 project radially outwards at diametrically opposed positions.

In the illustrated embodiment the retaining portions 17 which are integrally formed with the sleeve 15 have trough-like recess which open facing away from the drive member 13. A radially extending flange 18 extends from the sleeve 15 intermediate its ends and its first transverse face bears against the drive member 13. Arranged on the other transverse face 20 of the flange 18 is an annular bearing plate member 21, described in greater detail hereinafter, having a bearing surface against the associated release fork 12 bears. On the transverse face 20 of the flange 18 there is a connecting zone with the sleeve 15 itself including a cylindrical bearing surface 22 the outer diameter of which is slightly greater than the outer diameter of the sleeve 15.

According to the invention the sleeve 15 has, in addition, an interlock portion adapted to fix the bearing plate member 21 on the sleeve against rotation. The interlock portion comprises, in this embodiment, at least one key portion 24 protruding from the outer periphery of the sleeve 15. Preferably, two such key portions 24, as disclosed, are provided at diametrically opposed positions in generally axial registry with corresponding retaining portions 17.

The interlock portions 24 extend from the transverse face 20 of the flange 18 tangentially relative to the cylindrical bearing surface 22 and their free ends are spaced from the retaining portions 19.

The axial extent D1 of the key portions 24 is greater than the axial extent of the bearing plate member 21. In fact the axial extent D1 is greater than the axial extent D3 of the cylindrical bearing surface 22 which, in turn, is greater than the axial extent D2 of the bearing plate member 21.

Moreover, in the disclosed embodiment each key portion 24 forms a flat 25, the flats 25 being parallel to each other and to the axis of the clutch release bearing.

As is known per se, the drive member 13, like the operating member 11, is of overall annular configuration and includes a ball bearing, in the disclosed embodiment, or some other anti-friction bearing, the inner race of which forms the actuating member 14 adapted to come into contact with the release levers or fingers of an associated clutch and the outer race 27 bears against the transverse face 19 of the flange 18 of the operating member 11.

Also, as is known per se, the drive member 13 is axially clamped to the operating member 11 by an axially resilient washer 28 which is provided at its outer periphery with tabs 29 perforated with openings 30 at their ends for engagement with the lugs 32 formed at the outer periphery of the annular bearing member 21. The resilient washer 28 bears against the edge of the outer race 27 remote from the flange 18. Thus, the drive member 13 is resiliently urged axially against the flange 18 of the operating member 11.

In the disclosed embodiment the axial lugs 32 formed on the bearing plate member 21 for axial attachment to the resilient washer 28 are formed as axial extensions, of hook-like configuration in section, from a skirt 34 at the outer periphery of the annular bearing plate member 21. The skirt 34 on the bearing plate member 21 is received over the flange 18 of the operating member 11 and extends axially therebeyond.

The outer diameter of the outer race 27 of the ball bearing of the drive member 13 is smaller than the inner diameter of the skirt 34 of the annular bearing plate so that an annular gap or clearance J remains between the drive member 13 and the skirt 34 which partially surrounds it proximite to the flange 18 of the operating member 11. The drive member 13 is therefore free for radial displacement in all directions relative to the flange 18 of the operating member 11, in contact with the transverse face 19 on the flange 18, subject to the axial clamping force exerted by the resilient washer 28 thereon. Such a clutch release bearing is therefore of the self-centering variety.

The bearing plate member 21 is provided at its inner periphery, in the disclosed embodiment, with at least three notches, i.e., two notches 36 diametrically opposed to each other and adapted to clear the retaining portions on the operating member and at least one more notch 37 adapted to permit engagement of the bearing plate member 21 on one of the interlock portions 24 of the operating member 11. As the disclosed embodiment actually employs two interlock portions 24 there are likewise two corresponding notches 37 at the inner periphery of the bearing plate member 21.

Accordingly, the annular bearing plate member 21 has four notches at its inner periphery, in the present embodiment, in generally cruciform arrangement.

Figure 4:
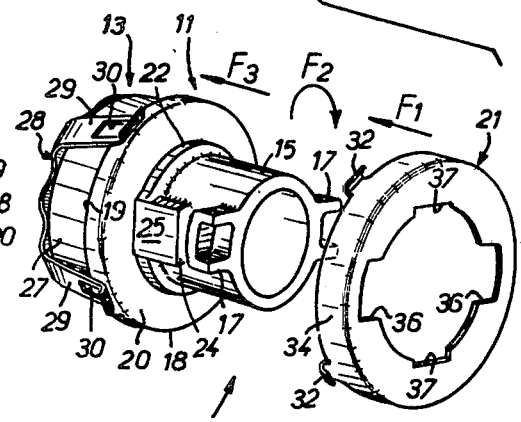
FIG. 4 is an exploded perspective view illustrating the mounting of the bearing plate member on the operating member of the release bearing.
Figure 5:
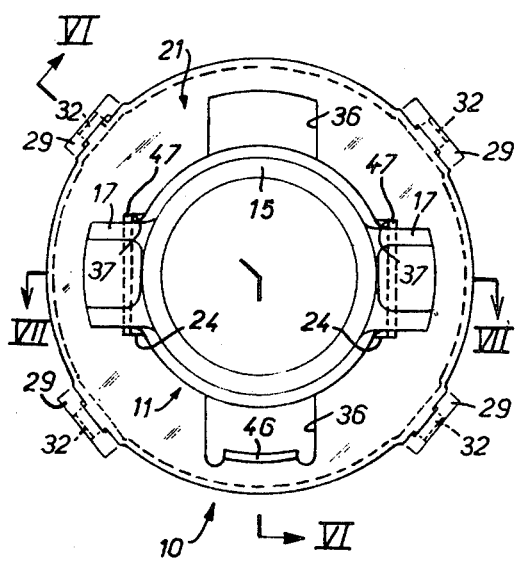
FIGS. 5–8 are views similar to those of FIGS. 1–4, respectively, for another embodiment, in FIG. 6 there is also illustrated a release fork associated with the release bearing.

As illustrated in FIG. 4, the bearing plate member 21 is mounted on the operating member 11 first by axial inserting the bearing plate member 21 on the sleeve 15 in the direction of arrow F1 in FIG. 4 until its notches 36 clear the retaining portions 17 on the operating member, then by rotating the bearing plate member 21 through about 90°, as shown by arrow F2 in FIG. 4, to bring the notches 37 into position facing the interlock portions 24 on the operating member 11, and lastly by further axial insertion of the notches 37 onto the interlock portions 24, as shown by arrows F3 in FIG. 4. At the end of the insertion of the annular bearing plate member 21, its axial lugs 32 snap under the tabs 29 on the resilient washer into the openings 30 therein.

As shown in FIG. 3, the clutch release fork 12 on which the release bearing 10 is to be mounted comprises an aperture 40 having two parallel sides 41 spaced a distance E from each other equal to the distance between the flats 25 defined on the outer faces of the interlock or key portions 24. The aperture 40 also has two cutouts, not visible in the drawings, for the passage of retaining portions 17 of the operating member 11.

The clutch release bearing 10 is mounted on the clutch release fork 12 by receiving the operating member 11 on the release fork through notches along the aperture 40, then by sliding movement in contact with the release fork radially relative to the release bearing until the key or interlock portions 24 of the operating member 11 come into contact with the parallel flanks or sides 41 facing each other on the edge of the aperture 40 in the release fork 12, FIG. 3.

At the conclusion of the sliding movement resiliently deflectable arms 42 carried on the release fork 12 move into bearing relation with the retaining portions 17 of the operating member 11, as illustrated in FIG. 3, which axially secures the release bearing 10 to the release fork 12 associated therewith. In actual fact there is first a resilient deflection of the arms 42 caused by the retaining portions 17, then, after clearing the retaining portions, the arms resiliently return or snap back to their initial configuration thereby radially securing the release bearing 10 to the release fork 12.

Furthermore, the interlock or key portions 24 on the operating member 11 together not only fix the bearing plate member 21 against rotation thereon but, in addition, fix the operating member against rotation and thereby the entire clutch release bearing 10 on the release fork 12.

Figure 1:
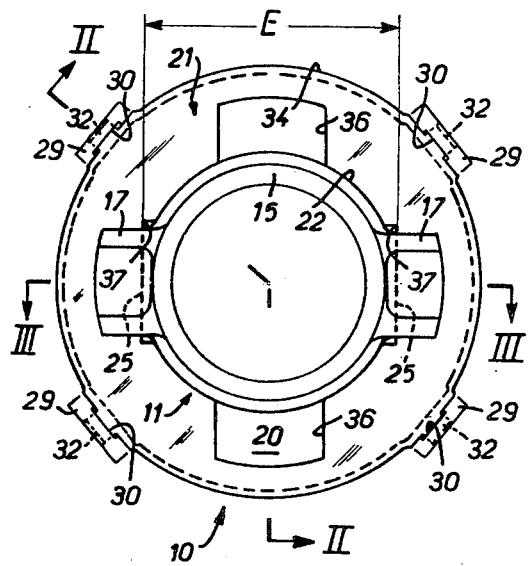
FIG. 1 is an elevational view of a release bearing embodying the present invention, taken along the direction of arrow I in FIG. 2.
Figure 2:
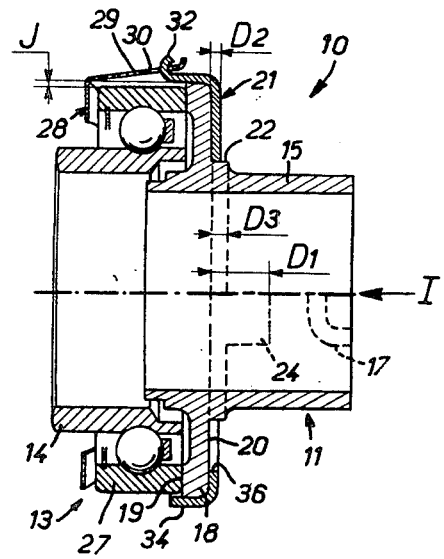
FIG. 2 is an axial cross-sectional view of the release bearing taken along the broken line II—II in FIG. 1.

According to the alternative embodiment illustrated in FIGS. 5-8, the bearing plate 21 is provided, at its inner periphery in line with notches 37 thereon, with axial tabs 47 adapted to bear against the corresponding key or interlock portions 24 on the operating member 11, as visible in FIGS. 1 and 3. In this way the tabs 47 laterally overlie the key or interlock portions 24 protecting the same from the release fork 12, since the latter bears against the tabs 47 and not the flats on the key portions 24, as in the embodiment of FIGS. 1-4.

Additionally, the bearing plate member 21 comprises at its inner periphery an axial tongue 46 protruding axially from the bearing plate member in the same direction as the tabs 47 and circumferentially disposed therebetween and therefore between and spaced from the corresponding notches 37.

Figure 6:
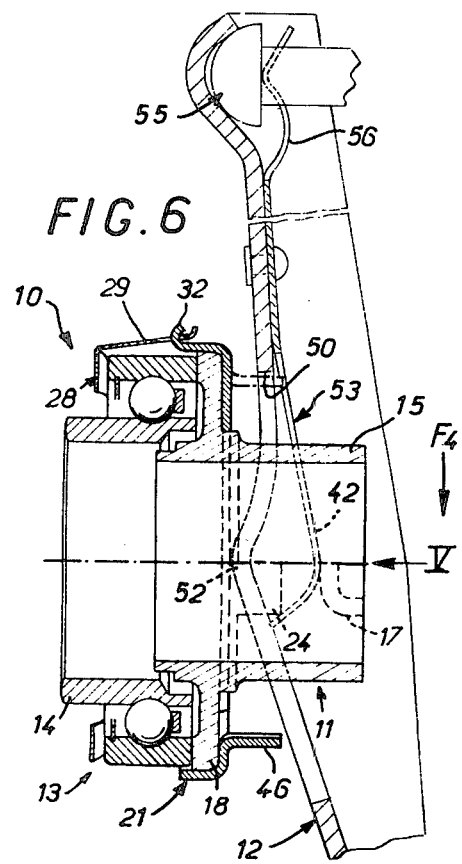
Figure 7:
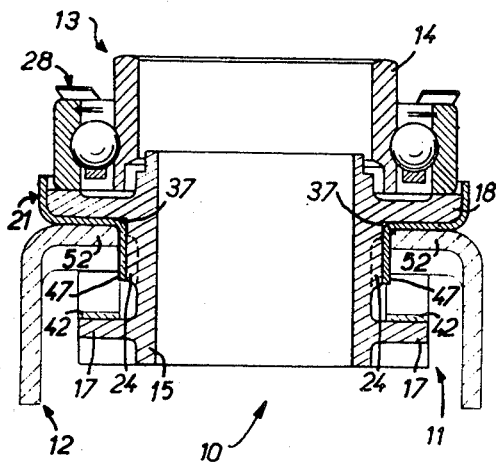
Figure 8:
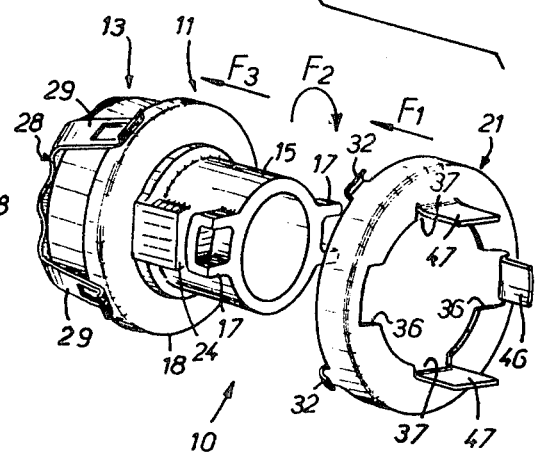

In practice, as illustrated in the embodiment of FIGS. 5-8, the tongue 46 is disposed at 90° relative to the tabs 47, and therefore at one of the notches 36 provided in the bearing plate member 21, as noted above. The utility of this tongue 46 will be better understood if reference is had to FIG. 6 showing the release fork 12 with which the release bearing 10 is associated.

The release fork 12 has, at its midsection, an aperture 50 through which the fork is adapted to receive the release bearing 10, and more specifically the sleeve 15 of the operating member 11, until the convex portion 52 engages the bearing plate member in contact with the tabs 47 thereon.

The foregoing resilient arms 42 which are part of leaf spring 53 and bear against a face of the retaining portions 17 facing toward the flange 18 resiliently bias the release fork 12 against the annular bearing plate member 21.

Moreover, the release fork 12 is pivoted about one of its ends on a swivel joint 55 at a fixed point relative to the associated clutch and deflectable resilient arms 56 which are part of the spring 53 resiliently bias the aforesaid end of the release fork 12 against the pivot 55.

Thereupon the mounting of the assembly requires after positioning the release bearing 10 on the release fork 12 and introducing the release bearing on its guide (not shown), downward sliding movement of the release fork with respect to the release bearing 10, in the direction of arrow F4 in FIG. 6, to slide out from under the swivel joint 55 and then a reverse upwards sliding movement of the release fork 12 with respect to the release bearing 10 for simultaneous engagement of the associated end of the release fork 12 with the swivel joint 55 on the operative side thereof and the engagement of the resilient arms 56 on the other or back side of the swivel joint 55.

The resilient tongue 46 on the annular bearing member 21 is disposed on the side of the release bearing 10 facing away from the end of the release fork pivotally mounted on the swivel joint 55, as illustrated in solid lines in FIG. 6.

Thus, the resilient tongue 46 does not interfere downward movement of the release fork 12 with respect to the release bearing 10, which is necessary as recited above for permitting the release fork to come off of the swivel joint 55.

This would not be the case if, as shown in dotted lines in FIG. 6, the tongue 46 was, on the other hand of the release bearing 10 facing the end of the release fork 12 which is pivotally mounted on swivel joint 55. In this event the tongue 46 would interfere with downward movement of the release fork 12, in the direction of arrow F4 in FIG. 6.

The assembly of the release bearing illustrated in FIGS. 5-8 is carried out in conformity with the description above with reference to FIGS. 1-4. As schematically represented by arrows F1, F2, and F3 in FIG. 8, there is, in succession, axial insertion of the annular bearing plate member 21, rotation of the annular bearing plate member through 90°, then further axial insertion until the ultimate position is attained in which the lugs 32 are hooked or snapped into the openings in the rabs 29.

The invention is not intended to be limited to the embodiments described and illustrated herein but rather includes all modifications, alternatives and expedients within the scope of the appended claims.

In particular, in the above described embodiments the annular bearing plate member 21 is axially attached to the resilient washer 28 which in turn comprises clamping means for the annular bearing plate member, however, other axial clamping means may be substituted therefor.

Further, the annular bearing plate member 21 may be held axially merely by means of the release fork 12 with which the release bearing is associated, whereby the release fork holds the annular bearing plate member 21 flush against the flange 18 upon the mounting of the release bearing thereon.

In addition, as it will have understood, a single notch is sufficient to prevent rotation of the annular bearing plate member and this notch is not necessarily at 90° with respect to the other notches in the annular bearing plate member.

Furthermore, these other notches are not absolutely essential for the axial clearance of the annular bearing member 21 beyond the retaining portions 17 on the operating member 11 although they advantageously facilitate the positioning of the annular bearing plate member. In lieu of such other notches it is possible to insert the bearing plate member 21 on the sleeve obliquely at an angle, first to clear one of the retaining portions and then in the event two such retaining portions are provided, to clear, after appropriate angular displacement, and shifting movement, the other retaining portion, provided that the inner periphery of the bearing plate member 21 has a sufficiently large diameter with respect to the sleeve 15 to permit such insertion and shifting movement.

Finally, the interlock portion on the operating member for cooperation with the inner periphery of the bearing plate member 21 with a view to fixing the bearing plate member against rotation is not necessarily formed as a flat and laterally raised or on a boss as illustrated in the disclosed embodiments.

Indeed, to prevent rotation as desired, the inner periphery of the bearing plate member has at least one complementary interlock portion adapted to cooperate in axial engagement with the interlock portion on the operating member. Hence, according to the invention the bearing plate member is fixed against rotation by the edge of its inner periphery.

Moreover, as it will have been noted, the axial tabs and tongue 46 and 47 extend from the tangential edges of the notches 36, 37 in line therewith, that is, along the radially outermost edge of the notches. As the tabs and tongue are formed integrally with the bearing plate member 21 they are formed by bending back the initially radial tongues and tabs at right angles, by grabbing the inner end thereof which, therefore, does not require additional material for their formation.

What I claim is:

1. Clutch release bearing of the type including an annular operating member having a retaining portion for retaining said operating member axially relative to release fork and displacement therewith, an annular drive member normally disposed coaxially of said operating member and having an actuating part adapted to actuate release means of a clutch, means clamping said drive member to said operating member, said operating member having a transverse face axially intermediate said retaining means and said drive member, an annular bearing plate member overlying said transverse face and providing a bearing surface for a release fork, the improvement comprising at least one notch along the inner periphery of said annular bearing plate member and an interlock portion on said operating member cooperable with said notch for preventing rotation of said bearing plate member relative to said operating member.

2. Clutch release bearing according to claim 1, said retaining portion projecting laterally from said operating member, wherein another said notch is provided along the inner periphery of said bearing plate member, said other notch being shaped to permit the passage of said retaining means therethrough in the course of mounting said bearing plate member on said operating member.

3. Clutch release bearing according to claim 2, wherein said operating member is provided with two said retaining portions and two said interlock portions, said bearing plate member having four said notches along its inner periphery.

4. Clutch release bearing according to claim 3, wherein said notches are in generally cruciform arrangement.

5. Clutch release bearing according to claim 1, wherein said interlock portion projects laterally from said operating member and axially from said transverse face and has a free end axially spaced from said retaining portion.

6. Clutch release bearing according to claim 1, wherein said interlock portion comprises a generally tangential flat.

7. Clutch release bearing according to claim 1, wherein the portion of the inner peripheral edge of said bearing plate member defining said notch cooperates with said interlock for preventing rotation of said bearing plate member on said operating member.

8. Clutch release bearing according to claim 1, wherein said interlock portion is of great axial extent than said bearing plate member whereby said interlock portion is also adapted to engage a release fork and prevent rotation of said operating member relative thereto.

9. Clutch release bearing according to claim 1, wherein said bearing plate member further comprises an axial tab in alignment with said notch and normally overlying said interlock portion on said operating member.

10. Clutch release bearing according to claim 1, wherein an axial tongue is in alignment with another said notch at the inner periphery of said bearing plate member circumferentially spaced from said first mentioned notch.

11. Clutch release bearing according to claim 1, for use with a release fork pivotally mounted at one of its ends, wherein said tongue is disposed on the side of release bearing facing away from the pivotally mounted end when said release bearing is attached to the release fork.

12. Clutch release bearing according to claim 9, wherein an axial tongue is disposed at the inner periphery of said bearing plate member circumferentially spaced from said notch, said tab and said tongue both extending from the same side of said bearing plate member.

13. Clutch release bearing according to claim 12, said operating member comprising two raised said interlock portions and said bearing plate member comprising two said notches shaped to receive said interlock portions, wherein said bearing plate member has a tab in line with each said notch and said tongue is disposed circumferentially between said tabs.

14. Clutch release bearing according to claim 13, wherein said tongue is angularly spaced 90° from said tabs.

15. Clutch release bearing according to claim 9 or 10, wherein said tab or said tongue extends along a generally tangential edge of a said notch with which it is aligned.

16. Clutch release bearing according to claim 9 or 10, wherein said tongue or tab is a cutout portion in said bearing plate member bent at right angles to a wall portion of said bearing plate member to which it is connected.

17. Clutch release bearing according to claim 1, two said release portions extending radially outwardly beyond said interlock portions in axial registry therewith, wherein a first pair of relatively deep notches are sized to permit displacement of bearing plate member onto said operating member and a second pair of relatively shallow notches snugly receiving said interlock portions following relative angular displacement of said bearing plate member on said operating member.

* * * * *